(12) United States Patent
Spinella et al.

(10) Patent No.: US 11,557,922 B2
(45) Date of Patent: Jan. 17, 2023

(54) ELECTRIC POWER BASE

(71) Applicant: EGGTRONIC ENGINEERING S.P.A., Modena (IT)

(72) Inventors: Igor Spinella, Modena (IT); Camilla Bettinelli, Modena (IT); Fabrizio Caramaschi, Carpi (IT)

(73) Assignee: EGGTRONIC ENGINEERING S.P.A., Modena (IT)

( * ) Notice: Subject to any disclaimer, the term of this patent is extended or adjusted under 35 U.S.C. 154(b) by 0 days.

(21) Appl. No.: 17/239,997

(22) Filed: Apr. 26, 2021

(65) Prior Publication Data
US 2021/0336486 A1 Oct. 28, 2021

(30) Foreign Application Priority Data

Apr. 28, 2020 (IT) .................. 102020000009202

(51) Int. Cl.
*H02J 50/12* (2016.01)
*H01F 7/02* (2006.01)
*H02J 7/00* (2006.01)
*H04B 5/00* (2006.01)

(52) U.S. Cl.
CPC ............ *H02J 50/12* (2016.02); *H01F 7/0231* (2013.01); *H02J 7/0042* (2013.01); *H04B 5/0037* (2013.01)

(58) Field of Classification Search
CPC .......... H02J 50/12; H02J 7/0042; H02J 7/342; H02J 7/0044; H02J 2310/22; H02J 50/05; H02J 50/10; H02J 50/005; H01F 7/0231; H01F 7/0252; H01F 7/20; H01F 38/14; H04B 5/0037
See application file for complete search history.

(56) References Cited

U.S. PATENT DOCUMENTS

| | | | | |
|---|---|---|---|---|
| 9,319,110 | B2* | 4/2016 | Kopychev | H04B 5/0075 |
| 2006/0043927 | A1* | 3/2006 | Beart | H02J 50/10 |
| | | | | 320/108 |
| 2010/0271296 | A1* | 10/2010 | Kopychev | H04B 5/0075 |
| | | | | 345/156 |
| 2012/0025628 | A1* | 2/2012 | Ichikawa | H02J 50/80 |
| | | | | 307/104 |
| 2015/0002088 | A1* | 1/2015 | D'Agostino | H02J 50/70 |
| | | | | 320/108 |
| 2015/0330437 | A1* | 11/2015 | Clouser | F16B 47/00 |
| | | | | 248/206.3 |
| 2016/0072336 | A1* | 3/2016 | Tamino | H02J 7/0042 |
| | | | | 156/60 |
| 2016/0285495 | A1* | 9/2016 | Vick | H04B 1/3877 |

(Continued)

FOREIGN PATENT DOCUMENTS

KR 20170090896 A 8/2017
WO 2010/150317 A1 12/2010

*Primary Examiner* — Jared Fureman
*Assistant Examiner* — Michael J Warmflash
(74) *Attorney, Agent, or Firm* — Browdy and Neimark, P.L.L.C.

(57) ABSTRACT

There is described an electric power base (100) comprising: a casing (105), a wireless transmitter (110) of electric energy placed in the casing (105), and an interface surface (120) placed external to the casing (105), at said wireless transmitter (110), which is adapted to receive in contact a device (500) to be powered, characterized in that said interface surface (120) is made available by at least one microsuction body (125).

11 Claims, 2 Drawing Sheets

(56) References Cited

U.S. PATENT DOCUMENTS

| | | | |
|---|---|---|---|
| 2018/0159369 A1 | 6/2018 | McSweyn | |
| 2021/0175757 A1* | 6/2021 | Bilfeld | H02J 50/10 |
| 2021/0226477 A1* | 7/2021 | Spinella | H02J 50/80 |
| 2021/0336482 A1* | 10/2021 | Spinella | H01F 27/02 |
| 2021/0359549 A1* | 11/2021 | Nahum | H02J 7/0044 |
| 2021/0367452 A1* | 11/2021 | Nahum | H04B 1/3883 |

* cited by examiner

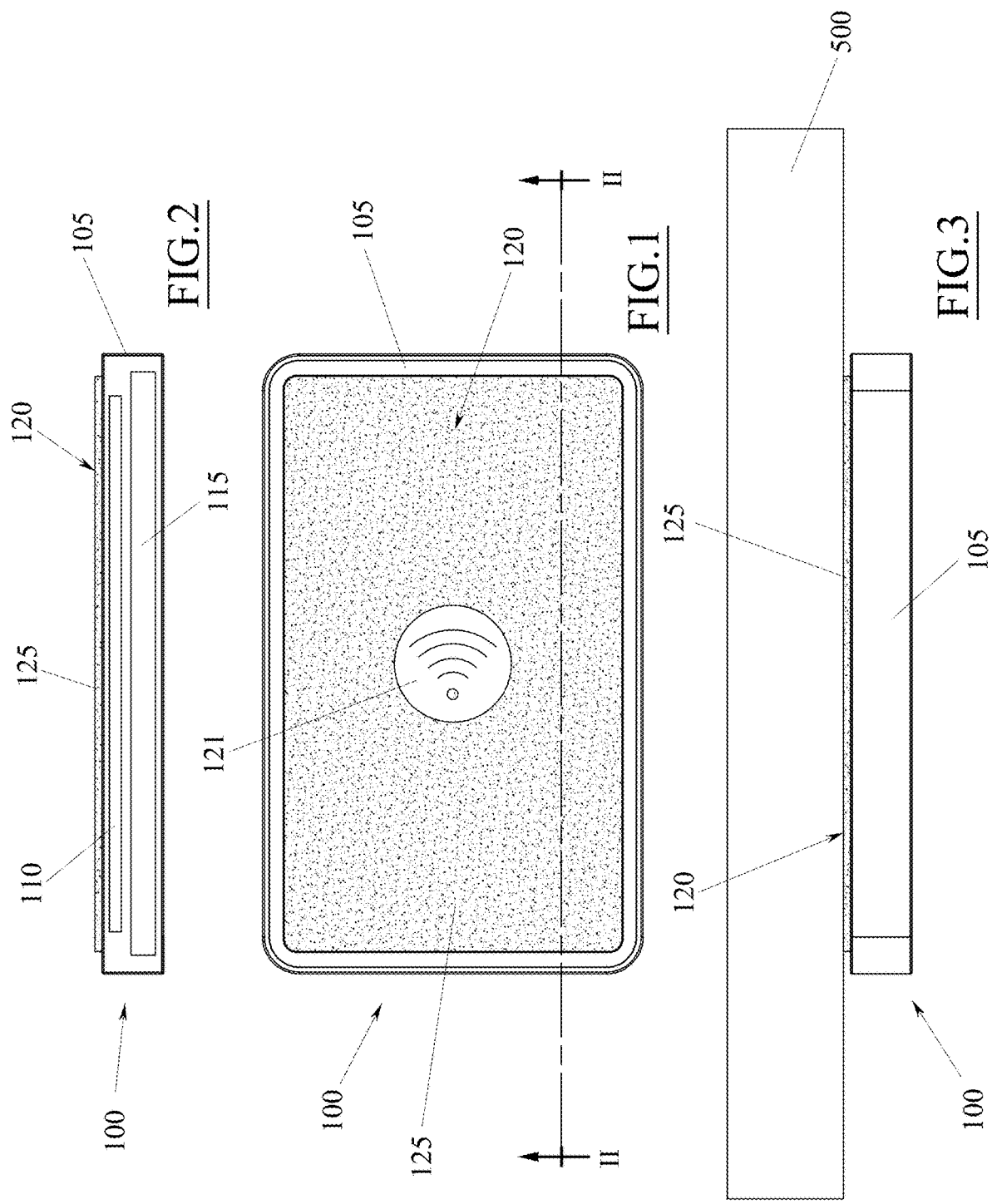

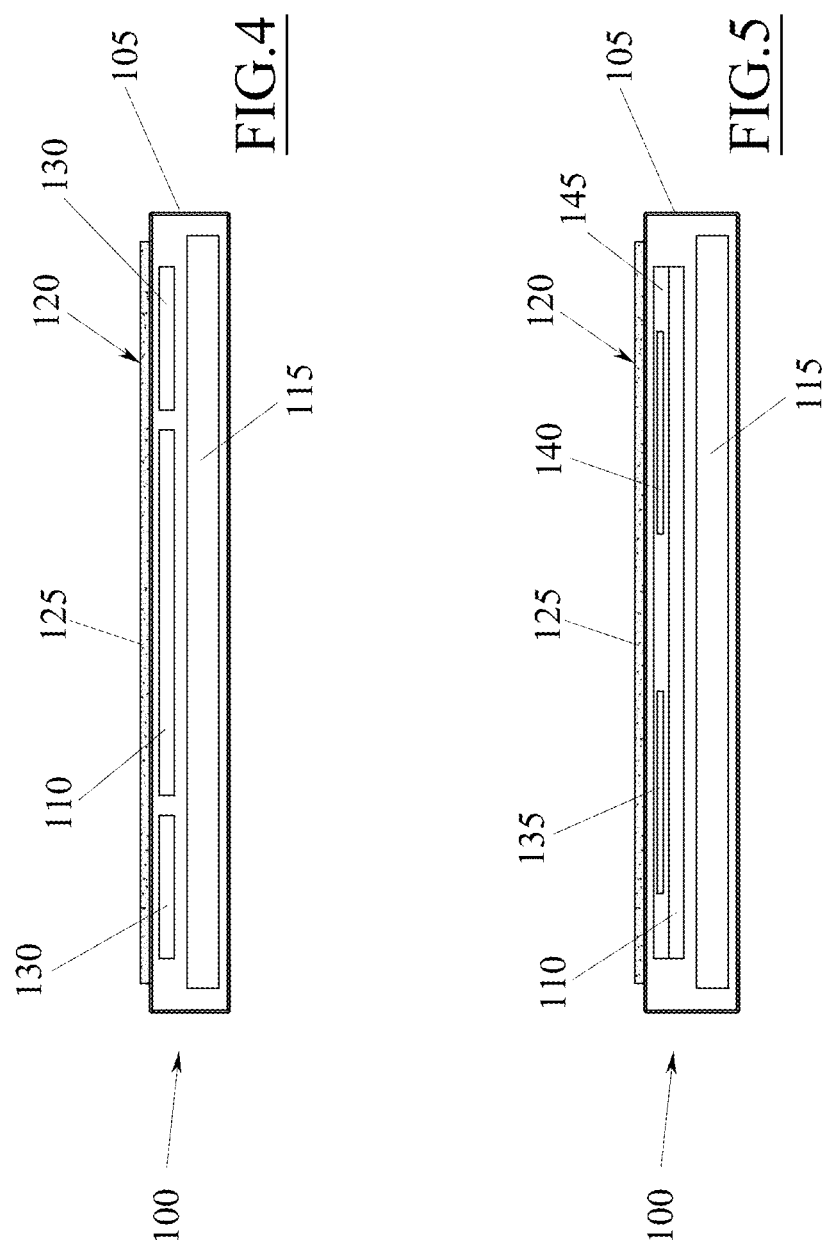

ELECTRIC POWER BASE

TECHNICAL FIELD

The present invention relates to a wireless power base which may be used to "wirelessly" power electric/electronic devices of various type, for example but not exclusively smartphones, laptop computers, tablet computers or any other portable device.

STATE OF THE ART

Several wireless power bases currently are known on the market which for example, through an inductive transmission system, are capable of electrically powering the aforesaid devices, for example in order to charge the internal batteries thereof. Some of these power bases operate when connected to an electric energy source, while others, also known with the name of wireless power bank, are provided with an internal accumulator, typically a battery, so as to be transported and used when a connection point to the power grid is not available.

A common feature to all wireless power bases is the fact that in order to allow an efficient transmission of the electric energy, the power base and the device to be powered are to be positioned in a rather accurate manner with respect to each other in order to ensure the correct alignment between a wireless transmitter of electric energy, placed in the power base, with a wireless receiver of said electric energy, placed in the device to be powered.

For example, if the power base implements an inductive transmission technology, at least one transmission coil of the power base is to be aligned with a corresponding receiving coil of the device to be powered.

For this reason, most wireless power bases are provided with at least one interface surface, which is generally identified by means of suitable graphic, touch and/or illuminated spots on which the users are to rest the device to be powered so the desired transmission of electric energy can occur.

But this resting action at times may be rather unstable, for example due to the shape/sizes of the device to be powered or simply due to the fact that the two bodies in any case remain separated, whereby they may move following small knocks or other stresses.

This problem, which in itself is not particularly critical when the power bases are used in static contexts, for example at home or in the office, is extremely felt when the power bases are used in mobility, for example when travelling.

In particular, it is impossible or extremely complicated to maintain the correct alignment between the charging base and the device to be powered when the same are transported in a bag or rucksack or pocket, just as it becomes highly inconvenient using the device to be powered while it is charging resting on the power base.

Various solutions aiming to improve the adhesion of the device to be charged to the interface surface of the power base have been explored in the past to try and overcome this drawback.

A first solution was the one of using non-slip rubber inserts, which however do not allow keeping the parts joined, making the transmission of electric energy impossible in situations of great instability, for example should the power base and the device to be powered be transported in a bag or rucksack.

A second solution was the one of using adhesive rubber inserts, which however have the drawback of attracting dust and becoming dirty very quickly, not only not being very hygienic, but quickly losing also the efficacy thereof in terms of adhesive effect.

Another known solution was the one of providing the power base with a plurality of suction cups at the interface surface, which suction cups have the advantage of stably coupling the device to be powered to the power base but they may not be highly appreciated from an aesthetical viewpoint.

Finally, a fourth solution was the one of using a double-sided adhesive layer, which however has the drawback of creating an almost irremovable connection between the power base and the device to be powered.

The result is that none of the solutions proposed to date is completely satisfactory.

DESCRIPTION OF THE INVENTION

In light of that disclosed above, it is an object of the present invention to resolve or at least mitigate the drawbacks of the known technique by making available an adhesion system which is simultaneously efficient, does not attract dust, is stable and does not have an excessive impact on the appearance of the power base.

It is another object to achieve the mentioned aim within the scope of a simple, rational and affordable solution.

These and other objects are achieved thanks to the features of the invention as set forth in the independent claim. The dependent claims outline preferred and/or particularly advantageous aspects of the invention, without however being essential for the implementation thereof.

In particular, an embodiment of the present invention makes available an electric power base comprising:
  a casing,
  a wireless transmitter of electric energy placed in the casing, and
  an interface surface placed external to the casing at said wireless transmitter, which is adapted to receive in contact a device to be powered,
wherein said interface surface is made available by at least one microsuction body, i.e. by a body consisting of a material capable of generating an adhesive effect by microsuction.

In practice, the outer surfaces of this material are grooved by several cavities having small/very small sizes, which are externally open so as to contain air.

When one of these surfaces is pressed down on by an object, the cavities are emptied of the air and adhere to the object by means of the difference in pressure with the external air, with a mechanism similar to the one of normal suction cups, but on a micrometric scale.

Thanks to this solution, it advantageously is possible, by simply pressing the device to be powered against the microsuction body, to obtain a strong adhesion that allows keeping the device to be powered joined to the power base also in particularly unstable situations, while always allowing an easy separation of the parts.

To allow this adhesion, the microsuction body is also elastically or visco-elastically yielding and therefore is capable of effectively compensating for the non-conformities of the typically rigid surfaces of the device to be charged and of the power base, thus creating a cushion effect which in fact increases the effective adhesion surface.

At the same time, the microsuction body is not sticky, does not attract dust and appears very similar to regular rubber, both from a visual and a tactile viewpoint, therefore having very few constraints from an aesthetical viewpoint and allowing a broad freedom of selection in the design that may be given to the power base. According to an aspect of the present invention, the microsuction body may be shaped like a thin layer, for example consisting of a portion of microsuction tape shaped as desired.

The microsuction tape may indeed be provided in tapes or sheets of various sizes, which may be blanked so as to give them any desired shape.

In this manner, the application of the microsuction body is rather simple and affordable, adapting well to the outer surfaces of the casing substantially having any shape.

According to another aspect of the invention, the wireless transmitter of electric energy placed in the power base may be of the inductive type, i.e. it may comprise at least one inductor (e.g. an antenna or an inductive coil) adapted to be inductively coupled with a corresponding inductor (e.g. a corresponding antenna or an inductive coil) in the device to be powered.

Alternatively or additionally, the wireless transmitter of electric energy could be of the capacitive type, i.e. it could comprise at least two armatures adapted to be capacitively coupled with at least two corresponding armatures placed in the device to be powered so as to overall create a pair of capacitances through which the electric energy may pass.

Both these solutions, each with their own peculiarities and characteristic advantages, are capable of ensuring a rather safe and efficient transmission of electric energy.

Further aspects of the present invention relate to the methods for exerting the pressure required to press the device to be powered down onto the interface surface defined by the microsuction body in order to activate the adhesion effect that allows keeping the device to be powered joined to the power base.

The simplest method provides for such pressure to be exerted by a user who manually presses the device to be powered and the charging base against each other. Another solution provides for the power base to comprise at least one magnet adapted to generate a magnetic pull from the outside towards the interface surface. In this manner, the magnet is capable of attracting any device to be powered that is at least partly made with ferromagnetic material against the interface surface, thus compressing the microsuction body and therefore activating the adhesion effect.

According to an embodiment, the aforesaid magnet may be a permanent magnet. In this manner, the union between the power base and the device to be powered advantageously is obtained by the sum of two forces, the microsuction one and the magnetic one, thus obtaining a more stable adhesion with respect to the individual systems considered individually.

For example, the microsuction body may create a kind of amplification of the force generated by the permanent magnet, which may therefore have relatively curbed sizes, thus reducing the costs, weight, overall dimensions and risk of attracting or damaging objects placed nearby.

According to a different embodiment of the invention, the magnet could be an electromagnet.

The advantage of this solution consists in the fact that the force of adhesion may remain entirely assigned to the microsuction body, while the electromagnet may be used only for brief time periods useful for creating the initial pressing action required to cause the device to be powered to adhere to the interface surface.

In this manner, a system is obtained that does not require external forces, can be driven in electric/electronic manner and does not imply an operating energy consumption because the electromagnet may be deactivated after obtaining the initial pressing action.

Possibly, it is possible to reactivate the electromagnet periodically and for short instants so as to totally restore the force of adhesion due to the microsuction body which, like regular suction cups, could display a decline over time due to air leaking into the cavities.

According to an aspect of this embodiment, the electromagnet may be a planar electromagnet because it allows keeping the sizes (e.g. the thickness) of the power base curbed.

It is also worth noting how a planar electromagnet may be made with a coil that is similar or identical to the inductive coils that may be used to wirelessly transmit the electric energy to the device to be powered should the power base be of the wireless inductive type.

To reduce the number of hardware components forming the power base, an embodiment of the present invention provides for the electromagnet to consist of an inductive transmission coil of the wireless transmitter.

By applying a direct current DC to the inductive coil, the latter behaves like an electromagnet and generates a static magnetic field capable of effectively attracting the device to be powered, which typically has a wireless receiver provided with a ferrite, which is attracted by the static magnetic field generated by the electromagnet placed on the primary.

This direct current DC may be applied to the inductive coil simultaneously to and overlapping the excitation AC required to transmit the electric energy to the device to be powered.

Alternatively, the electromagnet could consist of an auxiliary winding of the aforesaid inductive coil, which could be separate and independent from a primary winding for the transmission of the electric power, but it could share the same magnetic core (e.g. ferrite) with said primary winding.

Alternatively and similarly, the static magnetic field may be generated by the wireless energy receiving coil to attract the ferrite of the transmission coil.

Regardless of the specific embodiment of the electromagnet, it is preferable for the static magnetic field to be generated as soon a communication useful to starting the wireless supply is established between the device to be powered and the power base, after which the static magnetic field may be deactivated to curb the consumption, since the adhesion may be effectively kept by the microsuction effect alone. According to another embodiment, the power base may comprise at least one pair of insulated electrodes adapted to generate a force of electrostatic attraction from the outside towards the interface surface.

Thanks to this system, it advantageously is possible to also attract non-ferromagnetic devices, in particular made of non-conductive material, which therefore may press down on the microsuction body with similar methods to those described in relation to the magnets.

Another advantage of using the electrodes adapted to generate an electrostatic field lies in the fact that being mutually insulated, they do not allow the passage of current, and therefore ideally generate zero energy consumption.

Therefore, the electrodes generating the electrostatic force may always be kept active by continuously assisting the adhesion generated by the microsuction body and thereby improving the fixing between the device to be powered and the power base.

By keeping active the electrostatic system, the device to be powered is also constantly pressed on the microsuction material, thus avoiding or reducing the possibility for the air to progressively penetrate the micro-cavities, causing the detachment thereof.

According to a preferred aspect of this embodiment, the electrodes may be interdigitated electrodes.

This solution has the advantage of keeping the sizes of the power base curbed. Another advantage lies in the fact that the interdigitated electrodes may be efficiently used as electromagnetic shielding useful for reducing the emissions of the inductive wireless transmitter should the power base use this type of technology. Also in this case, it is possible to take advantage of a same hardware component to perform a dual function: the one of electrostatic attraction, to cause the pressing action, and therefore the activation, of the microsuction body, and the one of shielding/filtering the radiation emitted by the inductive coil of the wireless transmitter.

If the wireless transmitter is of the capacitive type, the electrodes for generating the electrostatic force may coincide with two or more transmission armatures of said wireless transmitter.

In practice, it is possible to generate the electrostatic force by simply applying a direct voltage DC to the armatures of the wireless transmitter, for example overlapping the excitation AC required for transferring the electric energy.

In this manner, both functions are effectively obtained without having to introduce any additional hardware component, with a particularly efficient, effective, thin and affordable system.

A different aspect of the invention provides for the power base to further comprise an accumulator of electric energy, for example one or more batteries, which is connected to the wireless transmitter, to provide the same with the electric energy to be transferred to the device to be powered.

In this way, the power base essentially is configured as a portable wireless power bank, which may advantageously be used to power electronic devices also in the absence of a connection point to the power grid.

Thanks to the presence of the microsuction body that keeps the parts joined in a stable and efficient manner, this wireless power bank may transfer electric energy to the electronic devices also in highly unstable and precarious conditions, for example when they are transported in bags, rucksacks or other containers.

BRIEF DESCRIPTION OF THE FIGURES

Further features and advantages of the invention will be more apparent after reading the following description provided by way of a non-limiting example, with the aid of the accompanying drawings.

FIG. 1 is a top plan view of a power base according to an embodiment of the present invention.

FIG. 2 is the section II-II indicated in FIG. 1.

FIG. 3 is a side view of the power base of FIG. 1, during a step of use.

FIG. 4 is the section of FIG. 2, relative to a second embodiment of the invention.

FIG. 5 is the section of FIG. 2, relative to a third embodiment of the invention.

DETAILED DESCRIPTION

The drawings show a power base 100 adapted to electrically power one or more electric/electronic devices 500, for example for recharging the inner batteries thereof and/or simply for allowing the operation thereof.

The devices 500 may be for example, smartphones, laptop computers, tablet computers or any other portable device, without however necessarily excluding devices that can be considered fixed, such as televisions, lamps and much more.

The power base 100 firstly comprises a casing 105, i.e. a casing adapted to define the outer shape thereof.

In the embodiment illustrated, the casing 105 is substantially shaped as a standalone object, which may have sufficiently curbed sizes to be easily transported from one place to another, for example in rucksacks, bags or other similar containers.

The outer shape of the casing 105 may obviously vary significantly for aesthetical reasons or for other reasons and is not a significant aspect of the present disclosure.

In other embodiments, the casing 105 could be defined and/or integrated in a more complex and/or cumbersome object possibly intended for substantially stationary applications, such as a table, desk, armrest, mobile container or another furnishing element, thus enriching the functionalities of this object with the possibility of also powering devices 500 associated, and/or that can be associated, therewith.

The power base 100 further comprises at least one wireless transmitter 110 of electric energy, which is contained in the casing 105 and is adapted to transmit electric energy externally in wireless manner, i.e. in the shape of electromagnetic waves carried wirelessly.

The wireless transmitter 110 may for example, be of the inductive type and therefore comprise at least one inductor, for example an antenna or an inductive coil, which is adapted to be inductively coupled with a corresponding inductor, for example with a corresponding antenna or a corresponding inductive coil, in the device 500 to be powered.

Alternatively or additionally, the wireless transmitter 110 can be of the capacitive type and therefore comprise two armatures (e.g. plates or foils made of electrically conductive material) adapted to be capacitively coupled with at least two corresponding armatures placed in the device 500 to be powered so as to overall create a pair of capacitances through which the transfer of the electric energy may occur. The armatures of the wireless transmitter 110 may be incorporated in, or covered by, a layer of dielectric material so as to be electrically insulated from each other. Regardless of the transmission technology used, the electric energy transmitted by the wireless transmitter 110 may come directly from a fixed power distribution network, to which the power base 100 may for example, be connected via cable.

More preferably however, said electric energy comes from a suitable accumulator 115 of electric energy, for example from one or more lithium batteries or batteries of any other type, which accumulator is contained in the casing 105 and is electrically connected with the wireless transmitter 110.

The presence of this accumulator 115, which may be of the rechargeable type, configures the power base 100 as a so-called wireless power bank, which may be effectively used to power devices 500 also in mobility or in any case in all the cases in which a connection point to the power grid is not available.

To allow the transfer of electric energy to the device 500, the power base 100 also generally comprises a conversion circuit, for example a suitable switching circuit, which is adapted to transform the input voltage, for example the direct voltage provided by the accumulator 115, into a suitable excitation AC, i.e. into a sequence of, preferably high-frequency, voltage waves and/or electric current that is applied to the wireless transmitter 110.

In order for the transmission of electric energy to occur efficiently, it however generally is necessary for the device 500 to be powered to be in a pre-set position with respect to the wireless transmitter 110, or in any case within a predetermined range of positions.

For example, if the wireless transmitter 110 is of the inductive type, at least one transmission coil of the wireless transmitter 110 is to be aligned with the receiving coil of the device 500 to be powered.

If the wireless transmitter 110 is of the capacitive type, the transmission armatures of the wireless transmitter 110 are to face the receiving armatures of the device 500 to be powered.

For this reason, the power base 100 makes available, external to the casing 105, at least one interface surface 120, which is adapted to receive resting, or in any case in contact, the device 500 to be charged and is positioned at the wireless transmitter 110 in such a manner whereby when the device 500 is resting or in any case in contact with said interface surface 120, the transfer of electric energy between the wireless transmitter 110 and the device 500 can occur correctly.

The interface surface 120, which may substantially be planar, may be indicated, for example by means of a graphic, touch and/or illuminated indicator 121. According to an important aspect of the invention, this interface surface 120 may be defined by at least one microsuction body 125, which may be fixed external to the casing 105, for example by gluing, mechanical constraint or any other suitable system.

Microsuction body 125 means a body consisting of a material capable of generating an adhesive effect by microsuction.

In practice, it is a material with a multitude of surface cavities generally having very small and/or microscopic sizes (micro-cavities), which are externally open and therefore are individually adapted to contain small quantities of air.

The micro-cavities may be for example, so small as to almost be invisible to the naked eye so that the exterior aspect of the material may, visually and to the touch, appear be very similar to the one of common rubber.

When an object is pressed against the outer surface of this material, the air contained in the micro-cavities is expelled, creating a vacuum (depression) that opposes the successive detachment of the object with a mechanism similar to the one of suction cups.

The force of adhesion obtained from each micro-cavity is in itself quite small, but if the contact area between the material and the object is rather broad, it advantageously is possible to obtain quite an increased force of adhesion overall thanks to the increased surface density of microcavities.

The force of adhesion is also controllable by means of the force with which the object is pressed against the material, since a greater pressure force corresponds to a greater expulsion of air from the micro-cavities and therefore, an increased force of adhesion, and vice versa.

It is then detected that such force of adhesion mainly acts in orthogonal direction to the surface of the material, in any case making possible a relatively simple detachment from the object through transversal stress, for example of peeling, without leaving any trace or residue.

Naturally, to obtain this effect, the material is to be elastically soft and/or yielding, for example like rubber, and also is to be substantially impermeable to the air so as to maintain the vacuum inside the micro-cavities.

For example, the material may be an acrylic foam.

Returning to the microsuction body 125 used in the power base 100, it may be shaped like a relatively thin layer of the aforesaid material, comprising a lower surface adapted to be fixed in contact with the outer surface of the casing 105, and an opposite upper surface adapted to remain externally exposed to define or contribute to defining the interface surface 120.

The thickness of said layer may be very small, for example equal to or less than 1 mm, and preferably equal to or less than 0.5 mm.

In particular, the microsuction body 125 may consist of a section of a so-called microsuction tape, the lower surface of which may be provided with a glue by means of which it may be directly fixed to the outer surface of the casing 105. The microsuction body 125 may be shaped and sized so as to define overall a sufficiently broad interface surface 120 as to remain in contact with a non-negligible portion of the device 500 to be powered.

However, it is not excluded in other embodiments for the interface surface 120 to be defined by a plurality of suitably sized and arranged microsuction bodies 125. Naturally, the number, shape and the sizes of the microsuction body(ies) 125 may vary significantly according to the specific applications, both according to technical needs and according to aesthetical needs.

In any case, thanks to the use of one or more microsuction bodies 125, it advantageously is possible to keep the device 500 stably in contact with the interface surface 120, thus making the power base 100 adapted to be used both in stationary situations and above-all, in situations of mobility, for example by ensuring the correct positioning also during transport in bags or rucksacks.

With respect to the solutions that employ an adhesive rubber, the microsuction body 125 does not attract dust, thus being more hygienic and less capable of becoming dirty during regular use.

By having an elastically yielding consistence, the microsuction body 125 also allows compensating for the non-conformities of the typically rigid surfaces of the device 500 and of the power base 100, thus obtaining a pillow effect which in fact increases the effective adhesion surface.

Finally, being similar to rubber both from a visual and tactile viewpoint, and being able to be shaped substantially as desired, the microsuction body 125 also has the advantage of not being a decisive element of the exterior aspect of the power base 100 which, unlike the solutions using true suction cups, may be designed according to countless different models with great freedom.

As mentioned above, in order for the microsuction body 125 to exert its adhesive effect, it however is necessary for the device 500 to be at least initially pressed against the interface surface 120, thus compressing the microsuction body 125 itself.

In certain embodiments, this pressure may be simply designated to the user who manually presses the device 500 against the microsuction body 125 of the power base 100. However, other embodiments may provide for the power base 100 to be provided with systems for exerting at least part of the aforesaid pressure, without requiring a manual intervention of the user.

For example, the embodiment illustrated in FIG. 4 provides for the power base 100 to comprise one or more magnets 130, each of which may be contained in the casing 105 and be adapted to generate a magnetic pull that acts from the outside of the casing 105 towards the interface surface 120.

In practice, each magnet 130 may be adapted to generate a magnetic pull having at least one component in direction that is orthogonal to the interface surface 120 and facing the inside of the casing 105.

In this manner, should the device 500 be at least partially made of ferromagnetic material, the magnet 130 is capable of attracting said device 500 against the interface surface 120, thus compressing the microsuction body 125 and therefore activating the adhesion effect. It is to be noted that most devices that can be charged by means of wireless inductive technology contain at least one ferromagnetic material, which is typically the ferrite of the coil receiving the energy.

The magnet 130 may be a permanent magnet so that the union between the power base 100 and the device 500 is constantly obtained by the sum of two forces, the magnetic one and the one due to the microsuction body 125, thus obtaining a more stable adhesion with respect to the individual systems considered individually. Thanks to this combined action, the permanent magnets 130 also are not to bear the whole weight of the device 500 and therefore may have relatively curbed sizes, thus reducing the costs, weight, overall dimensions and risk of attracting or damaging objects placed nearby.

Alternatively, the magnet 130 could be an electromagnet that is controlled by a suitable electric and/or electronic circuit, which may be contained in the casing 105 and may possibly power the magnet 130 with the electric energy accumulated in the accumulator 115.

This electric/electronic circuit may be configured so as to activate the magnet 130 only for a brief time interval useful for creating the initial pressing action of the microsuction body 125 required to cause the device 500 to adhere to the interface surface 120.

For example, the magnet 130 may be activated as soon as a communication useful for starting the wireless electric supply is established between the device 500 and the power base 100, and may be deactivated after a few instants.

Possibly, the electric/electronic circuit may be further configured to reactivate the magnet 130 periodically and for short instants, so as to restore the force of adhesion exerted by the microsuction body 125 which, like regular suction cups, could show a decline over time due to air infiltrations.

It may be advantageous for the magnet 130 to be a planar electromagnet to keep the sizes (e.g. the thickness) of the power base 100 curbed.

In particular, it is also worth noting how a planar electromagnet may be made with a coil that is similar or identical to the inductive coils that may be used to make the wireless transmitter 110, should the latter be of the inductive type.

Therefore, to avoid the introduction of additional hardware components in the embodiments that provide for a wireless transmitter 110 of the inductive type, it is possible to provide for each magnet 130 to consist of one or more inductive transmission coils of the wireless transmitter 110.

In practice, the electric/electronic circuit may be connected to the inductive coil and be configured so as to apply a direct current DC thereto, so that the inductive coil generates a static magnetic field capable of attracting the device 500.

This direct current DC may be applied to the inductive coil simultaneously to and overlapping the excitation AC required for the transmission of the electric energy to the device 500, or alternatively it may be applied when the coil is not excited in AC.

Alternatively, the magnet 130 could consist of an auxiliary winding of the inductive coil of the wireless transmitter 110, which auxiliary winding could be separate and independent from a primary winding to which the excitation AC is applied for the transmission of the electric power, but it could share the same magnetic core (e.g. ferrite) with said primary winding.

In the alternative embodiment illustrated in FIG. 5, the power base 100 may comprise at least one pair of electrodes 135 and 140, which may be contained in the casing 105 and are adapted to generate a force of electrostatic attraction that acts from the outside towards the interface surface 120.

In practice, the electrodes 135 and 140 may be adapted to generate a force of electrostatic attraction having at least one component in direction that is orthogonal to the interface surface 120 and facing the inside of the casing 105.

To generate the force of electrostatic attraction, the electrodes 135 and 140 may be incorporated in or covered by a layer of dielectric material 145 that makes them insulated, and they may be connected to an electric and/or electronic control circuit adapted to power them with a direct voltage DC, which may be drawn, for example by the accumulator 115, and converted into a sufficiently high voltage as to make the electrostatic attraction significant.

In this manner, the pair of electrodes 135 and 140 is capable of also attracting non-ferromagnetic devices 500, and in particular made of non-conductive material, which press down on the microsuction body 125, thus giving rise or contributing to the adhesion effect, with similar methods to those described in relation to the magnets 130.

A substantial advantage of the electrodes 135 and 140 however lies in the fact that being mutually insulated, they do not allow the passage of current, whereby despite the application of the direct voltage DC required to generate the electrostatic force, the system will have highly reduced energy consumption solely ascribable to the compensation for the leaks which (like the auto-discharge of a capacitor) may occur due to the non-ideality of the circuit and of the dielectric.

Therefore, the electrodes 135 and 140 may be kept continuously active, for example for the whole time in which the device 500 is powered, continuously assisting the adhesion generated by the microsuction body 125 and therefore improving the fixing between the device 500 to be powered and the power base 100.

By keeping active the electrodes 135 and 140, the device 500 is also constantly under pressure on the microsuction body 125, thus avoiding or reducing the possibility for the air to progressively penetrate the micro-cavities, which store their efficiency longer.

In order to keep the sizes of the power base 100 curbed, the electrodes 135 and 140 may be interdigitated electrodes.

This aspect is particularly useful when the wireless transmitter 110 is of the inductive type because the electrodes 135 and 140 could be effectively used also as electromagnetic shielding useful for reducing the emissions of the wireless transmitter 110.

If the wireless transmitter 110 were of the capacitive type, the electrodes 135 and 140 for generating the electrostatic force could instead coincide with the transmission armatures.

In practice, the electric/electronic circuit may be connected to the transmission armatures and be configured so as to apply a direct voltage therebetween so that the two transmission armatures generate an electrostatic field capable of attracting the device 500.

This direct voltage DC may be applied to the transmission armatures simultaneously to and overlapping the excitation AC required to transmit the electric energy to the device 500.

In this manner, both the functions of electrostatic attraction and of transmission of the electric energy are obtained without needing to introduce any additional hardware component.

Obviously, a person skilled in the art may make several technical-applicative modifications to all that above, without departing from the scope of the invention as hereinbelow claimed.

The invention claimed is:

1. An electric power base comprising:
a casing,
a wireless transmitter of electric energy placed in the casing for powering an electric/electronic device,
an interface surface placed external to the casing at said wireless transmitter, which is adapted to receive in contact the device to be powered, and
at least one pair of insulated electrodes incorporated in or covered by a layer of dielectric material and configured to generate a force of electrostatic attraction from the outside towards the interface surface,
wherein said interface surface is made available by at least one microsuction body,
wherein said wireless transmitter is of the capacitive type and comprises at least two transmission armatures,
wherein the insulated electrodes coincide with the transmission armatures of the wireless transmitter,
wherein the insulated electrodes are connected to an electric/electronic control circuit configured to power the insulated electrodes with an AC voltage and a direct voltage simultaneously and overlapping the AC voltage.

2. A power base according to claim 1, wherein said microsuction body is shaped like a thin layer.

3. A power base according to claim 2, wherein said microsuction body consists of a portion of microsuction tape.

4. A power base according to claim 1, comprising at least one magnet adapted to generate a magnetic pull from the out-side towards the interface surface.

5. A power base according to claim 4, wherein said magnet is a permanent magnet.

6. A power base according to claim 4, wherein said magnet is an electromagnet.

7. A power base according to claim 1, wherein said electrodes are interdigitated electrodes.

8. A power base according to claim 7, wherein said interdigitated electrodes are adapted to shield/filter the radiation emitted by at least one inductive transmission coil of the wireless transmitter.

9. A power base according to claim 1, comprising an accumulator of electric energy connected to the wireless transmitter.

10. An electric power base comprising:
a casing,
a wireless transmitter of electric energy placed in the casing for powering an electric/electronic device,
an interface surface placed external to the casing at said wireless transmitter, which is adapted to receive in contact the device to be powered,
at least one magnet adapted to generate a magnetic pull from the out-side towards the interface surface, and
an electronic circuit,
wherein said interface surface is made available by at least one microsuction body,
wherein said wireless transmitter is of the inductive type,
wherein the wireless transmitter comprises one or more inductive transmission coils,
wherein said magnet is an electromagnet,
wherein the electromagnet comprises one or more inductive transmission coils of the wireless transmitter,
wherein the electronic circuit is connected to the inductive transmission coils and is configured to apply to the inductive transmission coils an AC voltage and a direct voltage simultaneously and overlapping the AC voltage.

11. An electric power base comprising:
a casing,
a wireless transmitter of electric energy placed in the casing for powering an electric/electronic device,
an interface surface placed external to the casing at said wireless transmitter, which is adapted to receive in contact the device to be powered, and
at least one magnet adapted to generate a magnetic pull from the out-side towards the interface surface
wherein said interface surface is made available by at least one microsuction body,
wherein said wireless transmitter is of the inductive type,
wherein said magnet is an electromagnet,
wherein the wireless transmitter comprises one or more inductive transmission coils, and
wherein the electromagnet comprises an auxiliary winding, separate and independent from the inductive transmission coils but sharing a same magnetic core of the inductive transmission coils.

* * * * *